United States Patent [19]

Hentrich, Sr.

[11] 4,333,535
[45] Jun. 8, 1982

[54] DISC STANDARD ASSEMBLY

[75] Inventor: Robert D. Hentrich, Sr., Walcott, Iowa

[73] Assignee: Deere & Company, Moline, Ill.

[21] Appl. No.: 172,363

[22] Filed: Jul. 25, 1980

[51] Int. Cl.³ .............................................. A01B 21/08
[52] U.S. Cl. ...................................... 172/572; 172/566
[58] Field of Search ............... 172/573, 599, 570, 572, 172/600

[56] References Cited

U.S. PATENT DOCUMENTS

| | | | |
|---|---|---|---|
| 1,331,722 | 2/1920 | Remy | 172/572 X |
| 2,336,848 | 12/1943 | Cruse | |
| 2,675,659 | 4/1954 | Kopp | |
| 2,762,182 | 9/1956 | Gardner | |
| 2,979,138 | 4/1961 | Martensen | 172/579 |
| 3,061,018 | 10/1962 | Olson | 172/139 |
| 3,213,947 | 10/1965 | MacKenzie | 172/578 |
| 3,442,336 | 5/1969 | Morkoski | 172/572 |
| 3,454,106 | 7/1969 | Youngberg | 172/595 |
| 3,493,055 | 2/1970 | Peursem | 172/708 |
| 3,620,310 | 11/1971 | Richey | 172/600 |
| 3,640,348 | 2/1972 | Womble | 172/573 |
| 3,700,037 | 10/1972 | Hentrich | 172/705 |
| 3,700,038 | 10/1972 | Essex | 172/265 |
| 3,700,039 | 10/1972 | Essex | 172/705 |
| 3,757,871 | 9/1973 | Maust | 172/178 |
| 3,981,367 | 9/1976 | Mydels | 172/705 |
| 4,004,640 | 1/1977 | Bland | 172/710 |
| 4,066,132 | 1/1978 | Rehn | 172/572 |
| 4,193,456 | 3/1980 | Ankenman | 172/272 |
| 4,213,505 | 7/1980 | Jolley | 172/510 |

FOREIGN PATENT DOCUMENTS

| | | | |
|---|---|---|---|
| 12278 | 10/1977 | Australia | 172/572 |

*Primary Examiner*—Richard J. Johnson

[57] ABSTRACT

In a disc harrow, the disc gang is connected to the harrow frame by shock absorbing support assemblies. Each support assembly includes a rigid standard with an upper end fixed to the frame. The lower end of the standard is pivotally attached to a forward end of a bearing arm. The rearward end of the bearing arm supports the gang bolt via a bearing. A coil spring is connected between a yoke on the mid portion of the arm and a flange extending rearward from the upper end of the standard. A bolt extends through the flange and is threaded into the yoke so that the separation between the yoke and the flange may be adjusted to preload the spring.

15 Claims, 4 Drawing Figures

DISC STANDARD ASSEMBLY

BACKGROUND OF THE INVENTION

This invention relates to a cushioned standard assembly in a disc harrow implement.

"C" type springs are used in typical disc harrows to attach the disc gang to the harrow frame and to absorb motion shock therebetween. In normal harrow operation, the discs on one end of the disc gang may be less deeply sunk into the earth than the discs on the other end. This unequal depth may produce unequal working forces which act upon the two ends of the disc gang. In a harrow with conventional "C" type spring supports, these unequal working forces cause unequal deflections of "C" type spring supports associated with the disc gang. This unequal deflection causes the disc gang to pivot in a horizontal plane relative to the harrow frame so that the desired angle of the discs to the direction of travel is not maintained. It would be desirable to provide a disc gang support assembly which, while absorbing the shock due to collisions between the discs and obstacles, would reduce horizontal pivoting of the disc gang during normal operation.

SUMMARY OF THE INVENTION

It is an object of this invention to provide a disc harrow support assembly which readily yields to absorb the shock of collisions between the discs and obstacles.

It is a further object of this invention to provide a shock absorbing support assembly which substantially eliminates horizontal shifting or pivoting of the disc gang during normal operation.

These and other objects are achieved according to the applicant's invention in that it provides an improved shock absorbing support assembly for attaching a disc gang to a disc harrow frame. A pair of support assemblies support each disc gang from the harrow frame. Each support assembly includes a rigid standard with an upper end fixed to the harrow frame member. The upper end includes a rearward extending flange. The standard extends downward and slightly forward to a lower end. A bearing arm includes one end pivotally attached to the lower end of the standard. The other end of the arm carries a bearing which supports the gang bolt of the disc gang. A coil spring is attached between the flange and a yoke on the central portion of the bearing arm. An adjusting bolt, threadably attached to the yoke, extends through a bore in the flange and through the center of the coil spring and limits the separation between the arm and the flange to adjust the preload compression of the spring so that the discs are maintained at a desired depth during typical operating conditions. Disc scraper assemblies may be suspended from a frame member attached to a bracket at the rearward end of the flange.

DETAILED DESCRIPTION OF THE INVENTION

Figure 1:
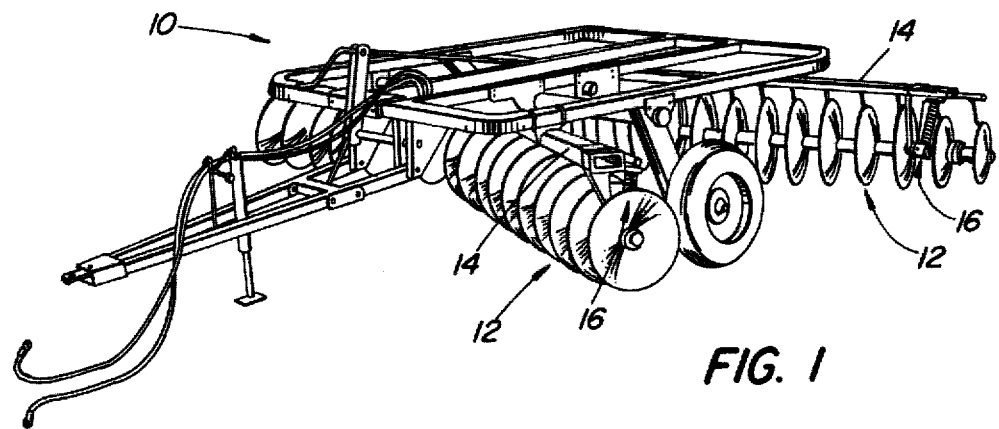
FIG. 1 is an oblique view of a disc harrow including applicant's invention.
Figure 2:
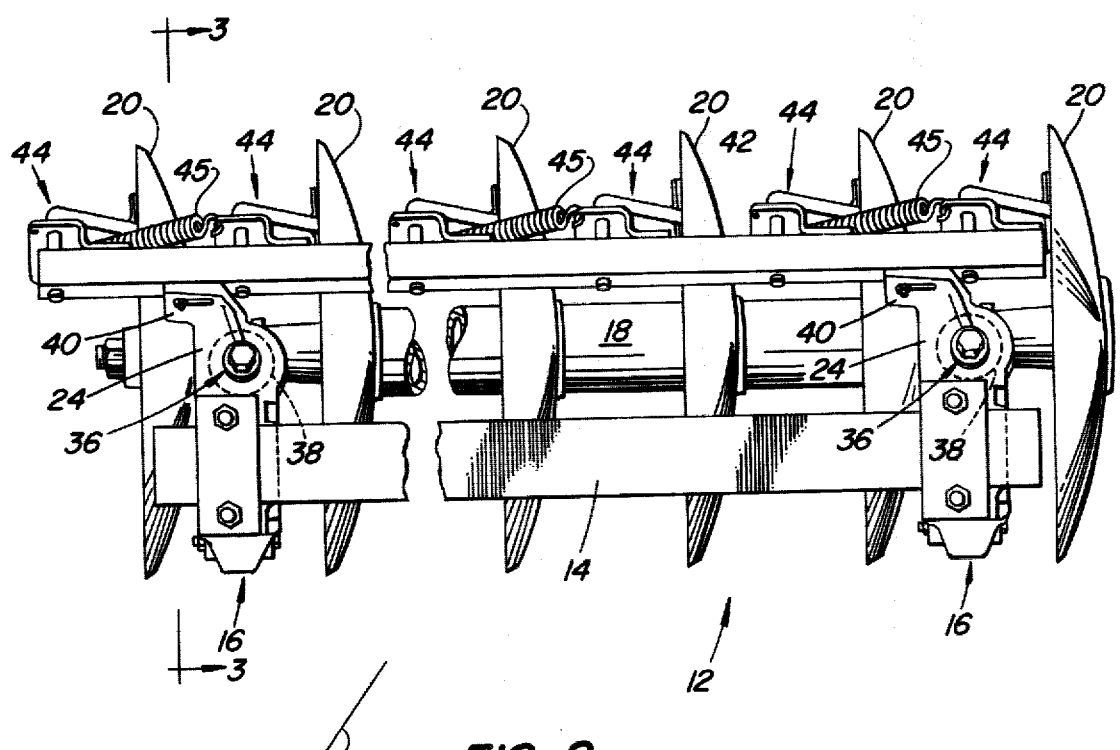
FIG. 2 is a top view of a disc gang assembly including applicant's invention.
Figure 3:
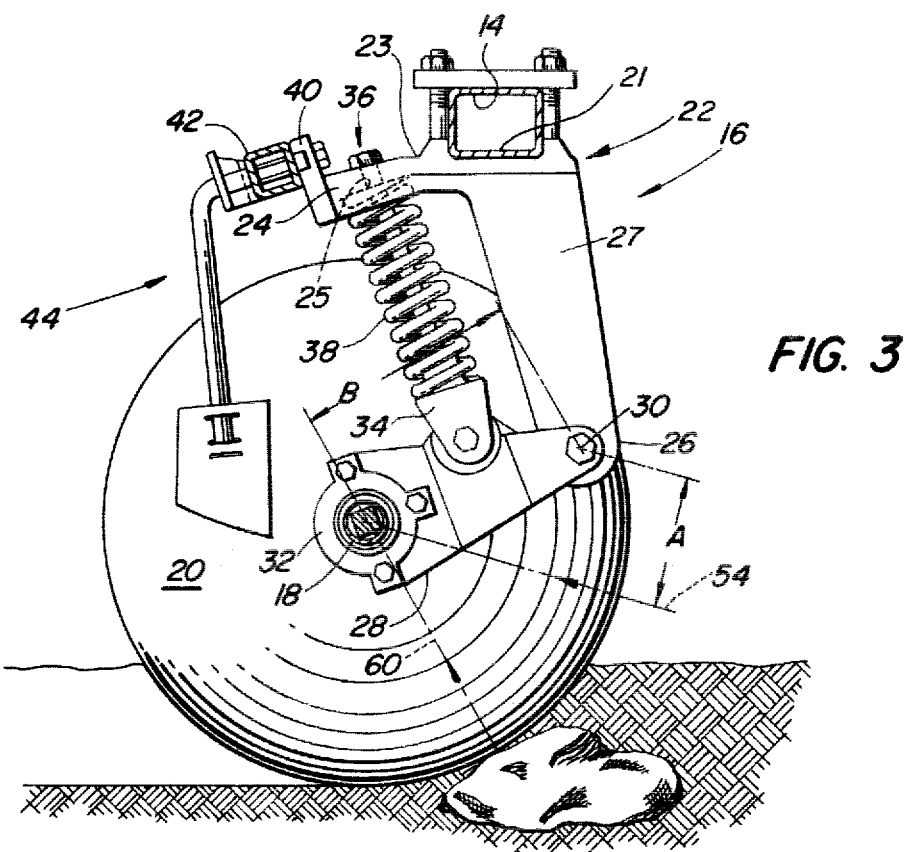
FIG. 3 is a side view in the direction of arrows 3—3 of FIG. 2.

Referring to FIGS. 1, 2 and 3, a disc harrow 10 includes a plurality of disc gangs 12 each suspended from a frame member 14 of rectangular cross-section by at least two support assemblies 16. Each disc gang 12 includes an elongated gang bolt 18 upon which a plurality of earthworking discs 20 are mounted in a fixed axial spaced relationship.

Referring now to FIGS. 2 and 3, each support assembly 16 includes a rigid standard 22 with an upper end or frame engaging portion 23 fixed or bolted to the frame member 14. The upper end 23 includes a generally upwardly opening recess 21 which engages and receives a portion of the frame 14. The upper end of standard 22 includes a substantially rearwardly and slightly downwardly extending flange 24 with a bore or aperture 25 extending therethrough. A leg 27 of standard 22 extends substantially downward and slightly forward from upper end 23 to a lower end 26. Each support assembly 16 also includes a rigid bearing arm 28 with a forward end pivotally attached at 30 to the lower end 26 of leg 27. The pivot at 30 allows arm 28 to pivot in a vertical plane, but prevents arm 28 from pivoting in a horizontal plane relative to the leg 27. A bearing assembly 32 is bolted to the rearward end of arm 28. The bearing assembly rotatably carries the gang bolt 18 which extends therethrough. The horizontal spacing between the pivot 30 and the bearing assembly 32 is larger than the vertical spacing therebetween. Furthermore, note that the radius of the disc 20 is greater than the length of arm 28 so that the spacing between the pivot 30 and the bearing assembly 32 is not greater than the radius of the disc 20. A yoke 34 is pivotally attached to a central portion of bearing arm 28 intermediate its forward and rearward ends. The shank of a bolt 36 extends through bore or aperture 25 with a threaded end received by yoke 34. The head of bolt 36 is engagable with an upper surface of flange 24, thus limiting the downward pivoting of arm 28 and maintaining a predetermined preload or compression of a spring 38. Spring 38 is shown as a coil spring, but those skilled in the art will recognize that other types of springs may be utilized. Coil spring 38 coaxially surrounds the shank of bolt 36 and is compressed between yoke 34 and a lower surface of flange 24. The rearward end of the flange 24 terminates in a bracket 40 to which is bolted a tubular cross member 42. A plurality of disc blade scraper assemblies 44 are pivoted to the cross member 42 and biased into engagement with discs 20 by springs 45.

MODE OF OPERATION

In the operation of the disc harrow 10, the discs 20 are pulled through the earth typically in a direction such as indicated by the arrow 50 as shown in FIG. 2 and at a desired angle with respect to the vertical planes of the discs 20. The passage of the discs 20 through the earth may produce typical working forces which act upon the disc gangs 12 in a direction with a relatively small incline with respect to the horizontal plane and in a direction opposite to the direction of travel of the discs 20. These working forces may act unequally upon opposite ends of the disc gang 12, for example, when one end of the disc gang is deeper in the earth than the other end. These unequal working forces tend to pivot the disc gang 12 in a horizontal plane relative to the frame member 14.

Now, with the applicant's support assemblies 16, the bearing arm 28 extends generally horizontally and rearwardly from the lower end 26 of standard 22 when the disc harrow is in operation. Because of this, and because the pivotal connection at 30 between standard 22 and arm 28 prevents arm 28 from pivoting in a horizontal plane with respect to standard 22 and frame member 14, the gang bolt 18 and the discs 20 are constrained to move substantially only in a vertical direction and are prevented from moving in a horizontal or lateral direction under the influence of the above mentioned unequal working forces. Thus, the pair of applicant's support assemblies 16, spaced apart between the disc gang 12 and the frame member 14, prevents pivoting of the disc gang 12 in a horizontal plane relative to the frame member 14, and maintains the desired angle between the planes of the discs 20 and their direction of travel.

The typical working force acts upon the discs 20 in the direction of arrow 54 viewing FIG. 3. This force tends to pivot arm 28, gang bolt 18 and discs 20 upwards and clockwise relative to the frame member 14 and standard 22 when viewing FIG. 3. However, the bolt 36 may be turned to adjust the compression of spring 38 so that the bias or preload of spring 38 may be maintained sufficiently large to substantially prevent upward pivoting of the arm 28 and discs 20 during normal operation. Thus, the support assembly 16 acts like a rigid member under normal tillage conditions.

However, when one of the discs 20 encounters a rock or other obstruction in the soil, then that disc may be subjected to an obstruction force in a direction with a larger incline with respect to the horizontal plane such as indicated by arrow 60 of FIG. 3. The larger vertical component of the obstruction force overcomes the bias of spring 38, causing arm 28 and disc 20 to pivot clockwise about 30 to raise the disc 20 over the obstruction. In this mode, the spring 38 absorbs and dissipates the energy of the collision between the disc 20 and the obstruction, thus preventing damage to the components of the disc harrow 10.

Figure 4:
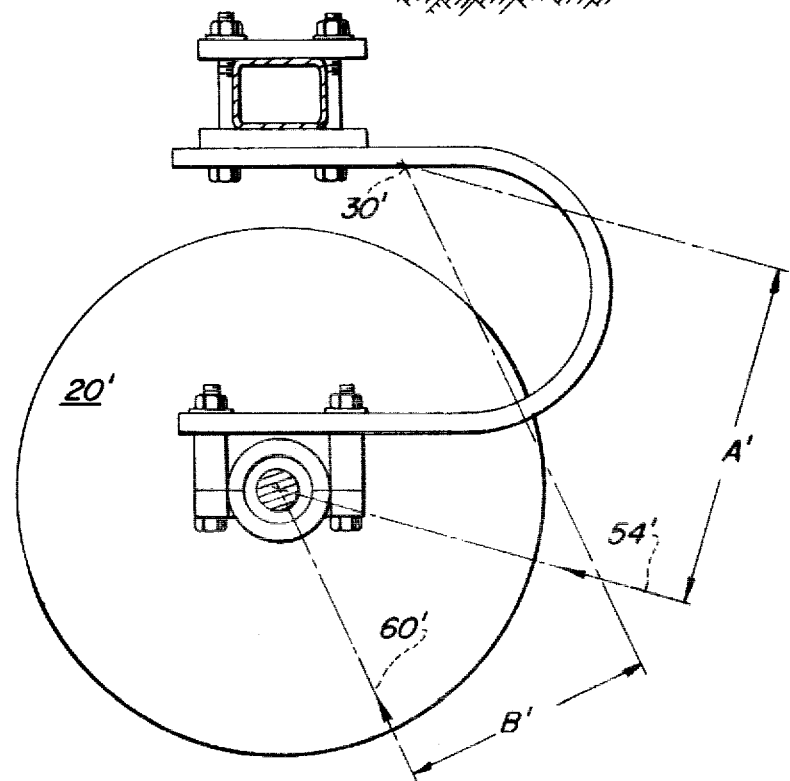
FIG. 4 is a view of a conventional "C" type support assembly.

An understanding of the operation of applicant's support assembly 16 may be aided by a discussion of the "moment arm" concept as it applies to this invention. During normal working operation, the typical working force 54 acts to pivot arm 28 through a moment arm of length A, as shown in FIG. 3. However, during a collision with an obstruction, the more steeply inclined obstruction force 60 acts through a much longer moment arm B. In fact, from viewing FIG. 3, it can be understood that the moment arm through which any force acts upon arm 28 decreases as the angle of that force with respect to the horizontal plane decreases. Conversely, with the typical "C" type spring shown in FIG. 4, the moment arm A', upon which acts the slightly inclined typical working force 54', is larger than the moment arm B', upon which acts the more steeply inclined obstruction force 60'. This is due to the fact that the disc 20' pivots about a pivot point 30' which is located near the upper end of the "C" type spring. In contrast, in applicant's support assembly 16, the disc 20 and the arm 28 pivot about a pivot point 30 located substantially below the level of the frame member 14 and near to the vertical level of the axis of the gang bolt 18. Since the obstruction force also tends to be larger than the typical working force, the resulting moment of force which tends to pivot arm 28 and one of the discs 20 upwards during a collision between that disc and an obstacle is much larger than the moment of force which results during typical operation. Thus, the applicant's support assembly 16 is substantially rigid during typical working operation, but yields as desired when one of the discs 20 encounters an obstacle.

I claim:

1. In a disc harrow with a frame, a disc gang and a support assembly for supporting the disc gang from the frame, the support assembly comprising:
   a standard with an upper end fixed to the frame and depending therefrom to a lower end remote from the frame;
   an arm with a first end and with a second end rotatably supporting the disc gang, the first and second arm ends having a horizontal separation which is larger than their vertical separation;
   pivot means for pivotally interconnecting the lower standard end and the first arm end and for confining the arm to pivot about an axis which lies in a horizontal plane, the arm having a length chosen so that the pivot means and an axis of the disc gang have a separation which is not greater than a radius of a disc of the disc gang; and
   resilient means connected between the arm and the upper end of the standard for resisting upward pivoting of the arm and disc gang.

2. The support assembly of claim 1, wherein:
   the upper end of the standard comprises a substantially rearward extending flange to which one end of the resilient means is connected.

3. The support assembly of claim 1, wherein:
   the arm extends substantially rearward from the lower end of the standard and includes a central portion intermediate its ends to which the resilient means is connected.

4. The support assembly of claim 1, wherein:
   the standard extends downward and slightly forward from its upper end to its lower end.

5. The support assembly of claim 1, further comprising:
   preload means for limiting downward pivoting of the arm and establishing a predetermined preload on the resilient means, the predetermined preload preventing upward pivoting of the arm unless the disc gang engages an obstacle.

6. The support assembly of claim 5, wherein:
   the resilient means coaxially surrounds a portion of the preload means.

7. In a harrow with a frame, a disc gang and at least two support assemblies for supporting the disc gang from the frame, each support assembly comprising:
   a rigid standard depending from an upper end fixed to the frame to a lower end remote from the frame;
   a rigid arm extending generally rearward from a first end pivotally attached to the lower end of the standard to a second end supporting the disc gang, the first and second arm ends having a horizontal separation which is larger than their vertical separation, the discs of the disc gang having a radius which is larger than the separation between the first and second arm ends, the arms and standards cooperating to substantially prevent pivoting of the disc gang in a horizontal plane relative to the frame while permitting pivoting of the disc gang in a vertical plane relative to the frame; and
   resilient means connected between the arm and the upper standard end for resisting upward pivoting of the arm and disc gang relative to the frame.

8. The support assembly of claim 7, wherein:

the upper end of the standard comprises a substantially rearwardly extending flange to which one end of the resilient means is connected.

9. The support assembly of claim 7, wherein:
the arm is pivotal relative to the standard about an axis which extends along a horizontal plane.

10. The support assembly of claim 8, further comprising:
means engagable with the flange and the arm for limiting separation therebetween and for establishing a predetermined preload on the resilient means, the predetermined preload preventing upward pivoting of the arm unless the disc gang engages an obstacle.

11. The support assembly of claim 10, wherein:
the limiting means comprises a rod with one end connected to the arm and with another end comprising a stop engagable with an upper surface of the flange; and
the resilient means comprises a coil spring coaxially surrounding the rod.

12. In a disc harrow with a frame, a disc gang and a support assembly for supporting the disc gang from the frame, the support assembly comprising:
a standard with an upper end fixed to the frame and depending therefrom to a lower end remote from the frame;
an arm with a first end and with a second end supporting the disc gang, the discs having a radius which is larger than the separation between the first and second arm ends;
pivot means for pivotally interconnecting the lower standard end and the first arm end and for confining the arm to pivot relative to the standard about an axis lying in a horizontal plane;
resilient means connected between the arm and the upper end of the standard for resisting upward pivoting of the arm and disc gang; and
preload means connected between the arm and the upper standard end for limiting downward movement of the arm and for establishing a preload on the resilient means, the preload preventing upward movement of the arm unless the disc gang engages an obstacle.

13. In a disc harrow having a frame, a disc gang and a support assembly for supporting the disc gang from the frame, the support assembly comprising:
a standard having an upper portion rigidly fixed to the frame, a leg projecting generally downward from the upper portion to a lower end remote from the frame and an apertured flange extending generally rearward from the upper portion;
an arm having a first end pivotally coupled to the lower end of the leg, a second end rearward of the first end and rotatably supporting the disc gang and a central portion intermediate the ends, the arm having a length chosen so that the pivot coupling between the leg and arm is separated from an axis of the disc gang by a distance which is not greater than a radius of one of the discs of the disc gang; and
resilient means coupled between the arm and the flange and biased to urge the arm and disc gang downwardly.

14. In a disc harrow with a frame, a disc gang and a support assembly for supporting the disc gang from the frame, the support assembly comprising:
a standard including a frame engaging portion having a generally upwardly opening recess therein for engaging and receiving a portion of the frame, an integral leg projecting downward and slightly forward from the frame engaging portion to a lower end remote from the frame engaging portion and an integral apertured flange extending rearwardly from the frame engaging portion;
an arm having a first end pivotally coupled to the lower end of the leg, a second end rearward of the first end and rotatably supporting the disc gang and a central portion intermediate the ends, the disc having a radius which is greater than the length of the arm between the first and second ends;
pivot means for pivotally coupling the lower leg end and the first arm end and for confining the arm to pivot in a vertical plane;
a yoke pivotally coupled to the central arm portion;
a bolt having a lower end threadably coupled to the yoke, a shank extending upwardly and rearwardly from the lower end through the aperture to a head normally engageable with an upper surface of the flange to limit downward pivoting of the arm; and
a coil spring surrounding the shank between the yoke and the flange, the bolt head engaging the upper flange surface to maintain a predetermined preload in the coil spring, the preload being sufficient to substantially prevent upward pivoting of the arm and disc gang during normal tillage operation, the preload permitting upward pivoting of the arm and disc when the disc encounters an obstruction.

15. In a harrow with a frame, a disc gang and at least two support assemblies for supporting the disc gang from the frame, each support assembly comprising:
a standard including a frame engaging portion having a generally upwardly opening recess therein for engaging and receiving a portion of the frame, an integral leg projecting downward and slightly forward from the frame engaging portion to a lower end remote from the frame engaging portion and an integral apertured flange extending rearwardly from the frame engaging portion;
an arm having a first end pivotally coupled to the lower end of the leg, a second end rearward of the first end and rotatably supporting the disc gang and a central portion intermediate the ends, the discs having a radius which is greater than the length of the arm between the first and second ends;
pivot means for pivotally coupling the lower leg end and the first arm end and for confining the arm to pivot in a vertical plane;
a yoke pivotally coupled to the central arm portion;
a bolt having a lower end threadably coupled to the yoke, a shank extending upwardly and rearwardly from the lower end through the aperture to a head normally engageable with an upper surface of the flange to limit downward pivoting of the arm; and
a coil spring surrounding the shank between the yoke and the flange, the bolt head engaging the upper flange surface to maintain a predetermined preload in the coil spring, the preload being sufficient to substantially prevent upward pivoting of the arm and disc gang during normal tillage operation, the preload permitting upward pivoting of the arm and disc when the disc encounters an obstruction.

* * * * *